(12) United States Patent
Jakobsson

(10) Patent No.: US 7,035,403 B2
(45) Date of Patent: Apr. 25, 2006

(54) ENCRYPTION METHOD AND APPARATUS WITH ESCROW GUARANTEES

(75) Inventor: Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 893 days.

(21) Appl. No.: 09/781,476

(22) Filed: Feb. 12, 2001

(65) Prior Publication Data

US 2002/0112166 A1 Aug. 15, 2002

(51) Int. Cl.
*H04L 9/32* (2006.01)
(52) U.S. Cl. ....................................................... 380/23
(58) Field of Classification Search .................. 380/23, 380/30, 286; 713/186, 181
See application file for complete search history.

(56) References Cited

U.S. PATENT DOCUMENTS 5,867,578 A * 2/1999 Brickell et al. ............. 713/180

OTHER PUBLICATIONS

U.S. Appl. No. 09/315,628, filed May 20, 1999, B. M. Jakobsson.

A. Young et al., "Towards Signature-Only Signature Schemes," Advances in Cryptology-ASIACRYPT 2000, pp. 97-115, Dec. 2000.

A. Young et al., "Auto-Recoverable Auto-Certifiable Cryptosystems," Advances in Cryptology-EUROCRYPT '98, pp. 1-31, Jun. 1998.

* cited by examiner

*Primary Examiner*—Gregory Morse
*Assistant Examiner*—Ellen C Tran

(57) ABSTRACT

A message to be transmitted through a network is encrypted such that the resulting encrypted message has associated therewith a proof of correctness indicating that the message is of a type that allows decryption by one or more escrow authorities. Each of at least a subset of the servers of the network includes a module for checking the proof of correctness if the corresponding encrypted message passes through the corresponding server in being transmitted from a sender to a recipient through the network. The encrypted message is therefore transmitted through the network to the recipient such that in traversing the network the proof of correctness associated with the encrypted message is checked by a designated check module of at least one server of the network. If the check of the proof of correctness indicates that the proof is invalid, the module of the server performing the check may direct that the encrypted message be discarded.

18 Claims, 3 Drawing Sheets

ENCRYPTION METHOD AND APPARATUS WITH ESCROW GUARANTEES

FIELD OF THE INVENTION

The invention relates generally to the field of cryptography, and more particularly to techniques for encrypting information in a manner which allows escrow guarantees to be provided.

BACKGROUND OF THE INVENTION

Escrow guarantees ensure that an appropriately-authorized governmental agency or other party can decrypt messages that have been encrypted by a given user. The escrowing of secret keys used in the decryption process allows the appropriately-authorized party to in effect implement a "digital wiretap" of encrypted data. In a typical escrow arrangement, multiple designated authorities each store fragments of the secret key of the given user. Then, if a sufficient number of these escrow authorities agree that a digital wiretap must be performed, they can together reconstruct the secret key of the user in order to perform the required decryption operation. Typically, the functionality of the escrow authorities is combined with or otherwise related to the functionality of a public key certification authority. For example, users may be required to register with the escrow authorities before their public keys are certified by the certification authority. This ensures that only those users for whom the escrow authorities can recover a secret key are allowed to receive certificates. Criminals, while they can still use encryption for their communication, do not have access to the public key certification infrastructure provided to honest users. The criminals will instead have to establish their identities with each other using a designated side channel in order to avoid the threat of decryption of their ciphertexts.

Although it is beneficial to escrow secret keys used for decryption, it may not be advisable to escrow secret keys used for generation of digital signatures. The reason is that this would in theory make a signer not accountable for his signatures, as he could always argue that the signature could have been produced by the escrow authorities. On the other hand, the escrow authorities could in fact could forge signatures of users whose secret keys they hold, as long as a sufficient number of the escrow authorities collude. Therefore, the legality of a given digital signature may be questionable if the secret key used to generate it is escrowed.

A need therefore exists for a technique that allows escrowing of decryption secret keys but which does not escrow signature generation secret keys. A problem that must be overcome in providing such a technique is that since both the encryption public key and the signature verification public key would generally have to be certified in order to be useful, an attacker could use the signature verification public key to encrypt a message, and a recipient of the message could use the signature generation secret key to decrypt. This "sign-the-new-public-key" type of attack is made possible by well-known similarities in the structures of conventional encryption and signature generation techniques.

SUMMARY OF THE INVENTION

The present invention provides improved encryption techniques which allow escrow guarantees without one or more of the problems of the above-described conventional techniques. In accordance with one aspect of the invention, a message to be transmitted through a network is encrypted such that the resulting encrypted message has associated therewith a proof of correctness indicating that the message is of a type that allows decryption by one or more escrow authorities. Each of at least a subset of the servers of the network includes a module for checking the proof of correctness if the corresponding encrypted message passes through the corresponding server in being transmitted from a sender to a recipient through the network. The encrypted message is therefore transmitted through the network to the recipient such that in traversing the network the proof of correctness associated with the encrypted message is checked by a designated check module of at least one server of the network. If the check of the proof of correctness indicates that the proof is invalid, the module of the server performing the check may direct that the encrypted message be discarded.

In accordance with another aspect of the invention, the encrypted message may be generated by first selecting a random element k from an interval [0 . . . q-1], where q denotes the size of a group G, using modulo p, then computing a symmetric key $K=\text{hash}(g^k \mod p)$ for a symmetric encryption technique (E, D), where g is a generator of the group G, and finally computing the encrypted message in the form of a ciphertext $M'=E_k(M)$, where M denotes the original message being encrypted. Also associated with the encrypted message may be an element $a=y_d^a * g^k$ and an element $b=g^\alpha$, where $\alpha$ a is chosen uniformly at random from [0 . . . q-1] and $y_d$ is a public encryption key, as well as a certificate $C_d$ on the public encryption key $Y_d$. The proof of correctness may be in the form of a proof of knowledge of $(\alpha, k)$ that does not reveal $y_d^a$ or $g^k$. The encrypted message M' may be transmitted as part of a quintuple (a, b, M', c, $C_d$), with the elements of the quintuple defined in the manner described above.

In accordance with a further aspect of the invention, the encrypted message M' is decrypted by a recipient computing $B=b^{x_d} \pmod p$, where $x_d$ is a secret key corresponding to the above-noted public key $y_d$, then computing $K=\text{hash}(a/B \mod p)$, and finally computing the original message M as $M=D_K(M')$.

In accordance with yet another aspect of the invention, the encrypted message may be considered valid by the check module of the server only if both the proof of correctness is valid and the certificate $C_d$ is valid. The proof of correctness may be a proof c in the form of a triple (r, s1, s2) which is generated by selecting two elements $\beta 1$ and $\beta 2$ at random from an interval [0 . . . q-1], computing $r=y_d^{\beta 2} * g^{\beta 2} \pmod p$, computing $e=\text{hash}(r, a)$, computing $s1=\beta 1+e*\alpha \pmod q$, computing $s2=\beta 2+e*k \pmod q$, and outputting the triple (r, s1, s2) as the proof c. The proof c can then be checked by computing $e=\text{hash}(r, a)$ and verifying that $y_d^{s1} * g^{s2}=r*a^e$.

The above-noted check module ensures that only certified public keys can be used for transmitting encrypted messages, and all certified public keys will generally have secret key counterparts that are escrowed. Therefore, if an attacker produces and signs a new public key, this new public key will not have the required certificate. The invention thus provides immunity against the above-described "sign-the-new-public-key" attack.

Advantageously, in an illustrative embodiment of the invention, no encrypted messages are delivered without the correctness check being performed by at least one check module of the network. Only correctly certified encryption public keys can be used to produce ciphertexts that pass the correctness check. All certified encryption public keys have their secret counterparts escrowed. In addition, a corresponding signature secret key $x_s$ is generally not escrowed, but cannot be used to produce valid and deliverable ciphertexts.

DETAILED DESCRIPTION OF THE INVENTION

The present invention will be illustrated below in conjunction with an information processing system in which the encryption techniques of the invention are implemented over the Internet or other type of network or communication channel. It should be understood, however, that the invention is more generally applicable to any type of electronic system or device application in which it is desirable to provide encryption with escrow guarantees. For example, although particularly well-suited for use with computer communications over the Internet or other computer networks, the invention can also be applied to numerous other information processing applications, including applications involving information transmission over wireless networks using wireless devices such as mobile telephones or personal digital assistants (PDAs).

Figure 1:
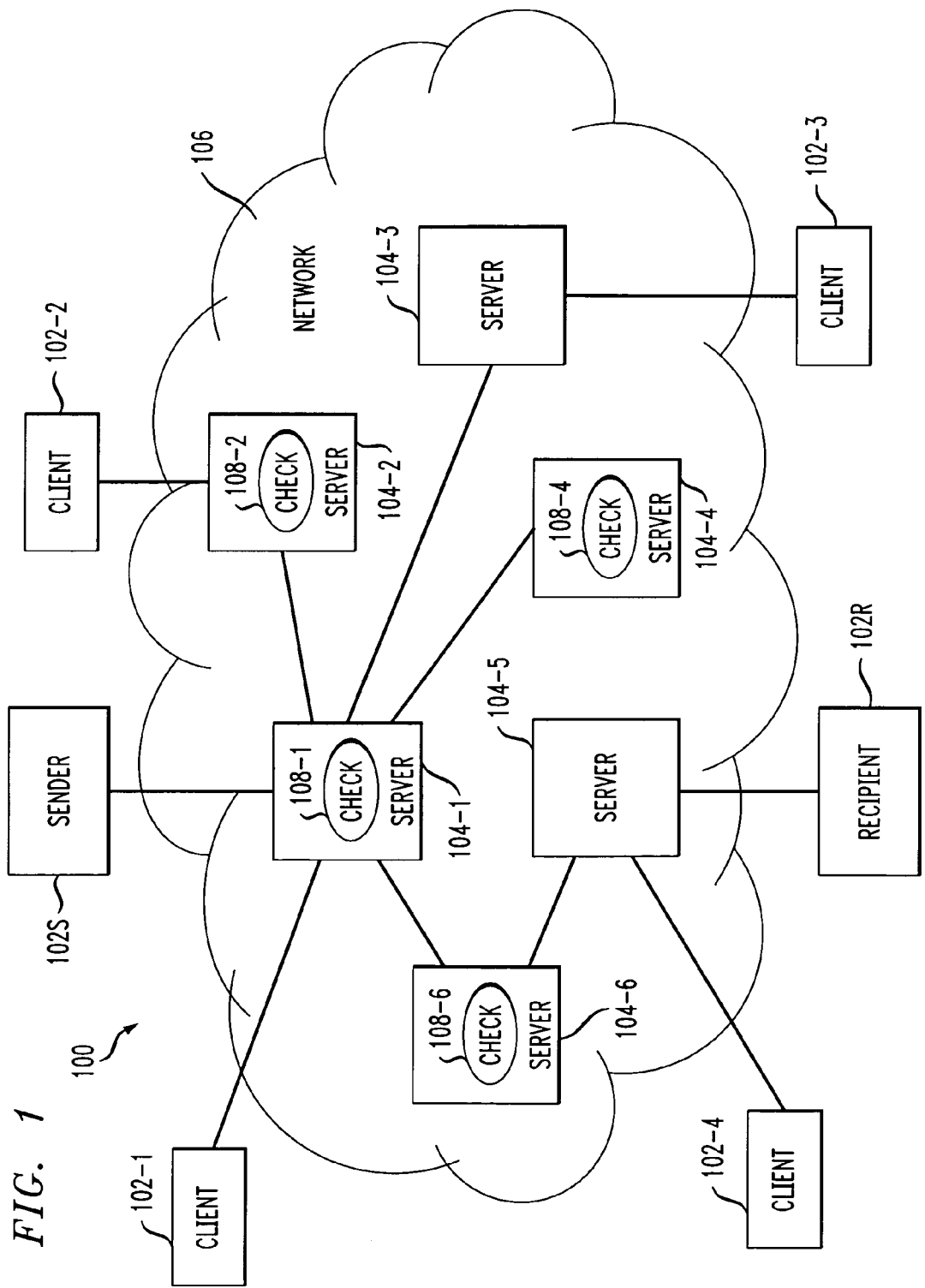
FIG. 1 shows an illustrative embodiment of an information processing system in which the present invention is implemented.

FIG. 1 shows an exemplary system 100 in which the encryption techniques of the invention are implemented. The system 100 includes a number of client devices 102 which communicate via servers 104 of a network 106. More particularly, the system 100 as shown includes client devices 102-1, 102-2, 102-3 and 102-4, as well as two additional client devices, a sender 102S and a recipient 102R. As will be described in greater detail below, the sender 102S encrypts a message that is transmitted through the network 106 to the recipient 102R. It should be understood that devices 102S and 102R are denoted as such by way of example only, and that other client devices in the system 100 may send and receive encrypted messages in a similar manner.

The client devices 102 may be desktop or portable personal computers, mobile telephones, PDAs, television set-top boxes or any other types of devices capable of transmitting or receiving information over network 106.

The network 106 may be a local area network, a metropolitan area network, a wide area network, a global data communications network such as the Internet, a private "intranet" network or any other suitable data communication medium, as well as portions or combinations of such networks or other communication media. In this embodiment, the network 106 includes servers 104-1, 104-2, 104-3, 104-4, 104-5 and 104-6, and may include additional servers not shown. At least subset of the servers of the network 106 are equipped with a CHECK module that will be described in greater detail below. The CHECK module is incorporated into a sufficient number of servers of the network 106 such that it is overwhelmingly likely that each message sent from one client to another over the network 106 will pass through at least one CHECK-equipped server on its way from source to destination. In the FIG. 1 embodiment, servers 104-1, 104-2, 104-4 and 104-6 are equipped with CHECK modules 108-1, 108-2, 108-4 and 108-6, respectively, while servers 104-3 and 104-5 do not include a CHECK module.

It should be understood that although particular arrangements of client devices 102 and servers 104 are shown in the FIG. 1 embodiment, the invention is more generally applicable to any number, type and arrangement of different client devices and servers.

Figure 2:
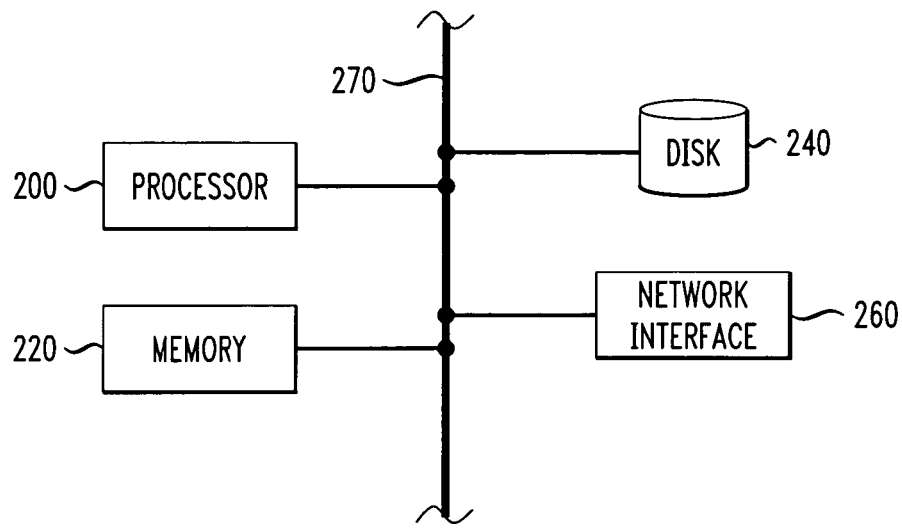
FIG. 2 is a block diagram of one possible implementation of a given one of the elements of the system of FIG. 1.

FIG. 2 shows one possible implementation of a given one of the client devices 102 or servers 104 of system 100. The implementation in FIG. 2 may thus represent one or more of the elements 102 and 104, as well as portions of these elements. In this example implementation, the element of system 100 includes a processor 200, an electronic memory 220, a disk-based memory 240, and a network interface 260, all of which communicate over a bus 270. One or more of the processing elements of system 100 may thus be implemented as a personal computer, a mainframe computer, a computer workstation, a smart card in conjunction with a card reader, or any other type of digital data processor as well as various portions or combinations thereof. The processor 200 may represent a microprocessor, a central processing unit, a digital signal processor, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 100.

The elements 102 and 104 of system 100 execute software programs in accordance with the invention in order to generate and process encrypted messages in a manner to be described in detail below. The invention may be embodied in whole or in part in one or more software programs stored in one or more of the element memories, or in one or more programs stored on other machine-readable media associated with the elements of the system 100.

Figure 3:
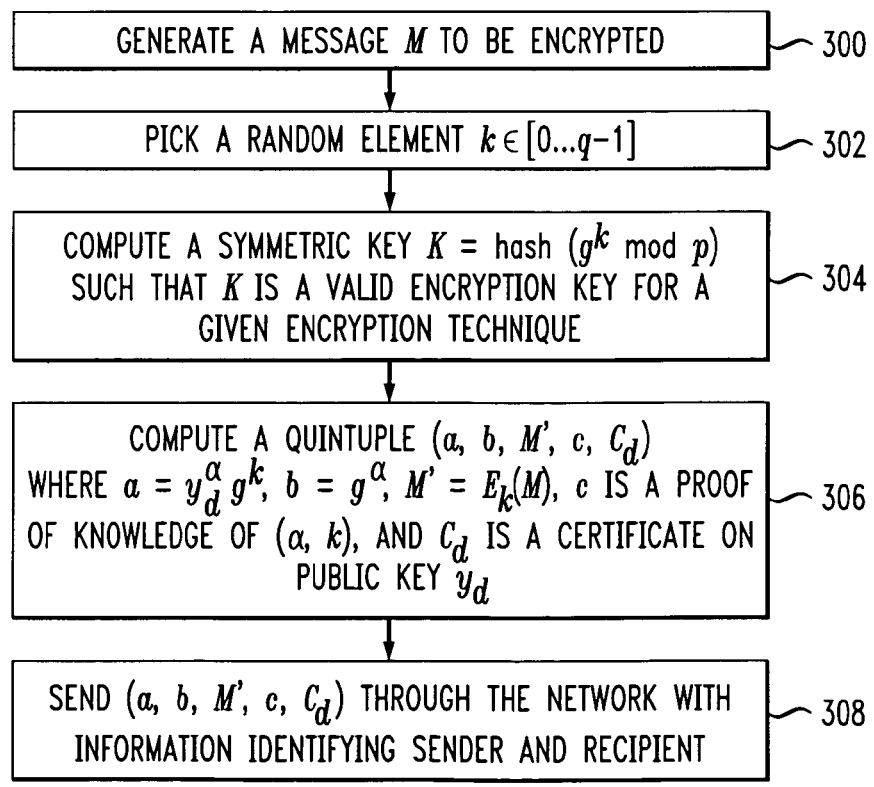
FIG. 3 is a flow diagram of an encryption process implemented by a sender element of the FIG. 1 system in accordance with the invention.

FIG. 3 is a flow diagram of an encryption process implemented by the sender 102S of the FIG. 1 system in the illustrative embodiment of the invention.

Let $x_d$ be a secret key for decrypting, and $y_d = g^{x_d}$ (mod p) be the corresponding public key for encrypting. Let $C_d$ be a certificate on $y_d$, produced by a certification authority. It is assumed in the illustrative embodiment that one or more escrow authorities each store at least a portion of $x_d$, so that given enough such portions, $x_d$ can be reconstructed if needed.

Let $x_s$ be a secret key for generating signatures, and $y_s = g^{x_s}$ (mod p) be the corresponding public key for signature verification. Let $C_s$ be a certificate on $y_s$, also produced by a certification authority (not necessarily the same authority that produced $C_d$).

Let M be a message to be encrypted by the sender 102S. The resulting ciphertext M' is transmitted over the network 106 to recipient 102R in a form to be described below.

The sender 102S performs the following operations shown in FIG. 3 in order to generate and transmit the ciphertext M':

Step 300. Generate the message M to be encrypted.

Step 302. Pick a random element k from the interval [0 ... q−1], where q denotes the size of a group G having generator g, i.e., g is a generator of a group G of size q, using modulo p.

Step 304. Compute a symmetric key K=hash($g^k$ mod p) for a suitable hash function, e.g., an MD5 or Secure Hashing Algorithm (SHA) hash function, such that K is a valid encryption key for a given encryption technique, e.g., a symmetric encryption technique (E, D). It should be understood that the invention does not require symmetric encryption techniques.

Step 306. Compute a quintuple (a, b, M', c, $C_d$), where a=$y_d^{\alpha}*g^k$, b=$g^{\alpha}$, M'=$E_K$(M), c is preferably a non-interactive zero-knowledge proof of knowledge of ($\alpha$, k) configured such that it does not reveal $y_d^{\alpha}$ or $g^k$, and $C_d$ is the above-noted certificate on $y_d$. The quantity $\alpha$ is chosen uniformly at random from [0 ... q−1]. An example of the proof c will be described below in conjunction with the flow diagram of FIG. 5. The element a associated with the encrypted message M' is generated using the public key $y_d$ of the recipient and can be decrypted by any party holding the corresponding secret key $x_d$. The element c proves that the element a can be decrypted by a party holding the corresponding secret key $x_d$.

Step 308. Send (a, b, M', c, $C_d$) through the network 106, along with information identifying the sender 102S and the recipient 102R.

As the above-noted quintuple is transmitted through the network 106, it passes through a number of the servers 104, at least one of which is equipped with the CHECK module 108. For example, in passing from the sender 102S to the recipient 102R over the network 102R, the quintuple may pass through three servers, i.e., 104-1, 104-6 and 104-5, two of which are equipped with the CHECK module 108. When a given CHECK-equipped server receives any message which is not plaintext, its CHECK module first determines if the message is in the form of the above-described quintuple. If the message is not in this form, it may be processed in a conventional manner. If the message is in this form, the CHECK module determines the validity of the proof c and the certificate $C_d$. If these items are both determined to be valid, then the CHECK module directs the forwarding of the message toward its destination. If one or both of c and $C_d$ are determined to be invalid, the CHECK module discards the message. The CHECK module is also preferably configured to distinguish a signature from a ciphertext, and will remove any message for which the proof c or the certificate $C_d$ is not valid.

An example process for determining if the proof c is valid will be described in conjunction with FIG. 6.

In general, the certificate $C_d$ in order to be considered valid has to be a valid certificate for encryption. More particularly, a given certificate $C_d$ may be accepted as valid in the illustrative embodiment if the following conditions hold:

1. $C_d$ is on a public key that is meant for encryption.
2. $C_d$ has a valid signature and/or expiration date associated therewith, and is not on a designated blacklist (listing retracted certificates) and/or is on a designated whitelist (listing still-valid certificates).
3. $C_d$ is produced by an accredited certification authority.
4. $C_d$ is correct with respect to its corresponding public key, i.e., a certification authority signature on the public key and other related information is valid, as defined by the associated signature scheme used for certification.

The above-described CHECK module ensures that only certified public keys can be used for transmitting encrypted messages, and as previously noted all certified public keys have secret key counterparts that are escrowed. If an attacker produces and signs a new public key, this will not have the required certificate. The invention thus provides immunity against the above described "sign-the-new-public-key" attack that can be effective against certain conventional techniques.

More particularly, the invention ensures that only valid encryption keys can be used to encrypt a message. In order for an encrypted message to be sent from sender 102S to recipient 102R in the illustrative embodiment, the following conditions must be met:

1. The sender 102S has a certified public key meant for encryption.
2. The proof c that accompanies the encrypted message is valid.
3. The certificate $C_d$ is considered valid as described previously.

If these conditions are satisfied, then it is known that an escrow authority (which may but need not be the same as or otherwise associated with the certificate authority that produced $C_d$) will be able to decrypt the transmitted ciphertext M' encrypted using the computed key K. As long as at least one CHECK-equipped server of the network 106 processes the encrypted message in its transmission from sender 102S to recipient 102R, only "safe" encrypted messages can be sent, where "safe" denotes that the escrow authority will know how to decrypt the message.

In the illustrative embodiment, the secret key $x_d$ of the recipient is required for decrypting the ciphertext M' (as will be described below in conjunction with FIG. 4), so the escrow authority will generally need this secret key to decrypt the ciphertext M'. However, it is possible for the escrow authority to decrypt the ciphertext without exposing the recipient's secret key, e.g., by using standard threshold-based methods that are well understood by a person skilled in the art. An example threshold-based method suitable for use in conjunction with the present invention is described in greater detail in A. Shamir, "How to Share a Secret," CACM, Vol. 22, 1979, pp. 612–613, which is incorporated by reference herein.

Figure 4:
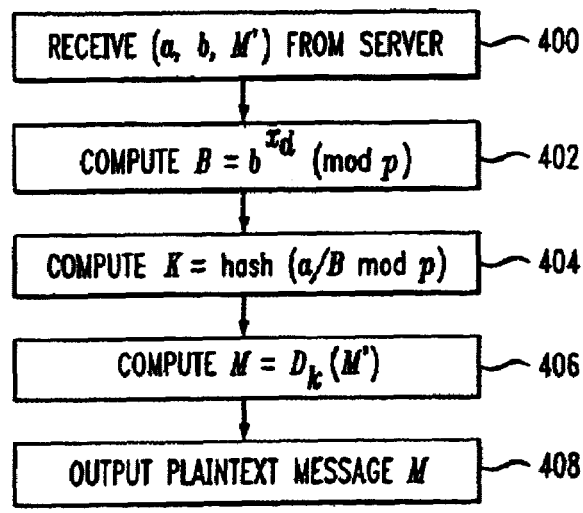
FIG. 4 is a flow diagram of a decryption process implemented by a recipient element of the FIG. 1 system in accordance with the invention.

FIG. 4 is a flow diagram of a decryption process implemented by the recipient 102R of the FIG. 1 system in the illustrative embodiment of the invention.

The recipient 102R performs the following operations in decrypting a message received from the sender 102S over the network 106:

Step 400. Receive (a, b, M') from the last server in the path from 102S to 102R. The proof c and the certificate $C_d$ may be removed by the last CHECK-equipped server in the path, since these elements of the transmitted quintuple are not required by the recipient.

Step 402. Compute B=$b^{x_d}$ (mod p).

Step 404. Compute K=hash(a/B mod p)

Step 406. Compute M=$D_K$(M')

Step 408. Output the plaintext message M.

Figure 5:
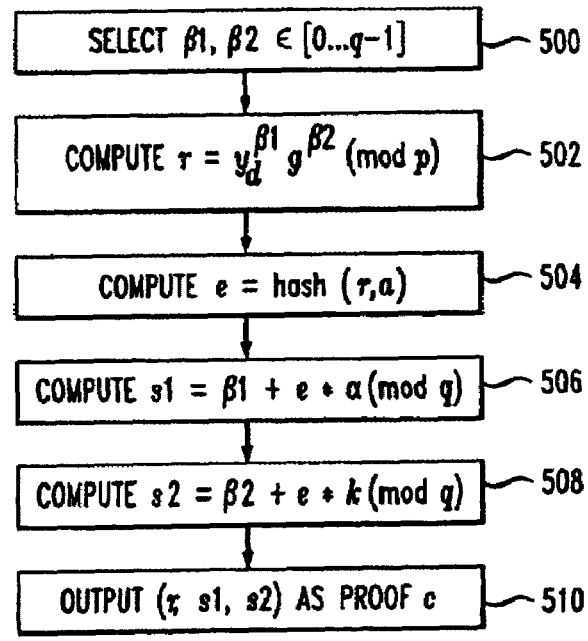
FIG. 5 is a flow diagram of a proof generation process implemented in the system of FIG. 1 in accordance with the invention.

FIG. 5 is a flow diagram of process suitable for use in generating the above-noted proof c in the illustrative embodiment of the invention. This proof generation process may be performed by the sender 102S as part of the message generation process of FIG. 3. The proof c is generated using the following steps:

Step 500. Select two random elements $\beta1$ and $\beta2$, both independently and at random from the interval $[0 \ldots q-1]$.

Step 502. Compute $r=y_d^{\beta2}g^{\beta2}(\mod p)$.

Step 504. Compute $e=\text{hash}(r, a)$ using a known hash function such as MD5 or SHA.

Step 506. Compute $s1=\beta1+e*\alpha(\mod q)$.

Step 508. Compute $s2=\beta2+e*k(\mod q)$.

Step 510. Output the triple $(r, s1, s2)$ as the proof c.

The proof c generated using the FIG. 5 process is incorporated into the quintuple $(a, b, M', c, C_d)$ generated in step 306 of FIG. 3 and transmitted through the network 106.

Figure 6:
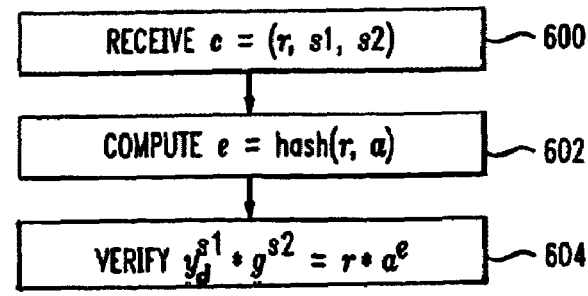
FIG. 6 is a flow diagram of a proof verification process that is implemented by a CHECK module of a given server element of the FIG. 1 system in accordance with the invention.

FIG. 6 is a flow diagram of a proof verification process that may be implemented by a CHECK module 108 of a given server 104 of the FIG. 1 system in the illustrative embodiment of the invention. The CHECK module 108 verifies the proof c of the form $(r, s1, s2)$ using the following steps:

Step 600. Receive the proof $c=(r, s1, s2)$ as part of the quintuple $(a, b, M', c, C_d)$.

Step 602. Compute $e=\text{hash}(r, a)$ using a known hash function such as MD5 or SHA.

Step 604. Verify that $y_d^{s1}*g^{s2}=r*a^e$. If it does, the proof c is valid. If it does not, the proof c is invalid.

It should be understood that the example proof c illustrated in conjunction with FIGS. 5 and 6 is only one example of a proof of correctness that may be utilized in conjunction with the present invention. Those skilled in the art will recognize that other types of proofs of correctness may be used to indicate that an associated encrypted message is of a type that allows decryption by one or more escrow authorities.

Advantageously, in the above described illustrative embodiment of the invention, no encrypted messages are delivered without a correctness check performed by at least one CHECK module. Only correctly certified encryption public keys can be used to produce ciphertexts that pass the correctness check. All certified encryption public keys have their secret counterparts escrowed. In addition, the signature secret key $x_s$ is not escrowed, but cannot be used to produce valid and deliverable ciphertexts. All deliverable messages are either in a plaintext format or in a format that can be decrypted by a recipient.

As previously noted, the present invention can be used in any encryption environment, but is particularly well-suited for use in computer networks. More specifically, the invention is of particular advantage in a corporate or other entity setting, where all communication is done on a proprietary network, where all users have the right to sign documents with signatures that must be binding in that they could only have been produced by the users in question, and where all communications can be decrypted if necessary.

The invention can be implemented in conjunction with any of a wide variety of known public key encryption and signature generation techniques. For example, the signature generation may utilize well-known Schnorr, El Gamal or DSA techniques. Alternatively, using a different key structure for the signatures, an encryption technique such as RSA may be employed. Additional details regarding these and other encryption and digital signature techniques suitable for use in conjunction with the present invention can be found in A. J. Menezes et al., "Handbook of Applied Cryptography," CRC Press, 1997, which is incorporated by reference herein.

It should be understood that the above described embodiments of the invention are illustrative only. For example, the invention can be applied to other types of information processing systems and corresponding arrangements of client and server device(s), and different encryption and signature techniques may be used. Furthermore, the particular processes utilized in a given embodiment may vary depending upon application-specific factors such as the configuration and capabilities of the client and server devices, etc. These and numerous other alternative embodiments within the scope of the following claims will be apparent to those skilled in the art.

What is claimed is:

1. A method for encrypting a message to be transmitted over a network, wherein the method comprises the steps of:

encrypting the message for transmission over the network, the resulting encrypted message having associated therewith a proof of correctness indicating that the message is of a type that allows decryption by one or more escrow authorities; and transmitting the encrypted message through the network to a recipient, wherein in traversing the network the proof of correctness associated with the encrypted message is checked by at least one module of a server of the network.

2. The method of claim 1 wherein the encrypted message is generated by first selecting a random element k from an interval $[0 \ldots q-1]$, where q denotes the size of a group G, using modulo p, then computing a symmetric key $K=\text{hash}(g^k \mod p)$ for a symmetric encryption technique $(E,D)$, where g is a generator of the group G, and finally computing the encrypted message in the form of a ciphertext $M'=E_K(M)$, where M denotes the message being encrypted.

3. The method of claim 1 wherein also associated with the encrypted message is an element $a=y_d^{\alpha}*g^k$ and an element $b=g^{\alpha}$, where $\alpha$ is chosen uniformly at random from $[0 \ldots q-1]$ and $y_d$ is a public encryption key.

4. The method of claim 3 wherein the proof of correctness comprises a proof of knowledge of $(\alpha, k)$ that does not reveal $y_d^{\alpha}$ or $g^k$.

5. The method of claim 1 wherein also associated with the encrypted message is a certificate $C_d$ on a public encryption key $y_d$.

6. The method of claim 5 wherein the encrypted message is considered valid by the module of the server if the proof of correctness is valid and the certificate $C_d$ is valid.

7. The method of claim 6 wherein the certificate $C_d$ is considered valid if it is a valid certificate for encryption.

8. The method of claim 1 wherein the proof of correctness comprises a proof c in the form of a triple $(r, s1, s2)$.

9. The method of claim 8 wherein the proof c is generated using the steps of:

selecting two elements $\beta1$ and $\beta2$ at random from an interval $[0 \ldots q-1]$;

computing $r=y_d^{\beta2}g^{\beta2}(\mod p)$;

computing $e=\text{hash}(r, a)$;

computing $s1=\beta1+e*\alpha(\mod q)$;

computing $s2=\beta2+e*k(\mod q)$; and outputting the triple $(r, s1, s2)$ as the proof c.

10. The method of claim 2 wherein the encrypted message is decrypted by a recipient using the steps of:

computing $B=b^{x_d}(\mod p)$, where $x_d$ is a secret key corresponding to a public key $y_d$;

computing $K=\text{hash}(a/B \mod p)$; and computing the message M as $M=D_K(M')$.

11. The method of claim 8 wherein the proof of correctness comprising the proof c in the form of the triple $(r, s1, s2)$ is checked by computing $e=\text{hash}(r, a)$ and verifying that $y_d^{s1}*g^{s2}=r*a^e$.

12. The method of claim 1 wherein if the check of the proof of correctness indicates that the proof is invalid, the module of the server directs that the encrypted message be discarded.

13. The method of claim 1 wherein the network comprises a plurality of servers, and wherein each of at least a subset of the servers includes a module for checking the proof of correctness if the corresponding encrypted message passes through the corresponding server in being transmitted from a sender to the recipient through the network.

14. The method of claim 1 wherein the one or more escrow authorities comprises an escrow authority associated with a public key used for encryption of the message, and wherein the escrow authority associated with the public key is able to decrypt the encrypted message to obtain a plaintext message.

15. The method of claim 14 wherein the escrow agent associated with the public key is able to decrypt the encrypted message without exposing a corresponding secret key, using a threshold-based method.

16. The method of claim 1 wherein associated with the encrypted message is a first element that is generated using a public key of the recipient and can be decrypted by a party holding the corresponding secret key, and a second element that proves that the first element can be decrypted by a party holding the corresponding secret key.

17. An apparatus for encrypting a message to be transmitted over a network, wherein the apparatus comprises:

a processor-based device for encrypting the message for transmission over the network, the resulting encrypted message having associated therewith a proof of correctness indicating that the message is of a type that allows decryption by one or more escrow authorities; wherein the encrypted message is transmitted through the network to a recipient, and in traversing the network the proof of correctness associated with the encrypted message is checked by at least one module of a server of the network.

18. An article of manufacture comprising one or more software programs for use in encrypting a message to be transmitted over a network, wherein the one or more software programs when executed implement the step of:

encrypting the message for transmission over the network, the resulting encrypted message having associated therewith a proof of correctness indicating that the message is of a type that allows decryption by one or more escrow authorities;

wherein the encrypted message is transmitted through the network to a recipient, and wherein in traversing the network the proof of correctness associated with the encrypted message is checked by at least one module of a server of the network.

* * * * *